US 8,602,668 B2

(12) United States Patent
Cvek

(10) Patent No.: US 8,602,668 B2
(45) Date of Patent: Dec. 10, 2013

(54) COMPUTER KEYBOARD SYSTEM WITH ALTERNATIVE EXERCISE CAPABILITIES FOR THE PREVENTION OF REPETITIVE STRESS INJURIES

(76) Inventor: Sava Cvek, Jamaica Plain, MA (US)

( * ) Notice: Subject to any disclaimer, the term of this patent is extended or adjusted under 35 U.S.C. 154(b) by 256 days.

(21) Appl. No.: 13/027,266

(22) Filed: Feb. 14, 2011

(65) Prior Publication Data

US 2012/0039650 A1     Feb. 16, 2012

Related U.S. Application Data

(60) Provisional application No. 61/303,717, filed on Feb. 12, 2010.

(51) Int. Cl.
*G06F 3/02* (2006.01)
*G06F 1/16* (2006.01)

(52) U.S. Cl.
USPC .............. 400/472; 400/477; 400/718; 341/22

(58) Field of Classification Search
CPC ........ G01F 3/021; G06F 3/0219; A63B 23/16
USPC ........................ 400/472, 718, 477; 482/44–49
See application file for complete search history.

(56) References Cited

U.S. PATENT DOCUMENTS

| 4,075,465 | A | * | 2/1978 | Funk et al. | ................. 235/145 R |
| 4,878,055 | A | * | 10/1989 | Kasahara | ......................... 341/23 |
| 5,305,238 | A | * | 4/1994 | Starr et al. | .................... 702/176 |
| 5,400,213 | A | * | 3/1995 | Honda et al. | ............. 361/679.08 |
| 2008/0222286 | A1 | * | 9/2008 | Plumpton | ..................... 709/224 |
| 2009/0030767 | A1 | * | 1/2009 | Morris et al. | ..................... 705/9 |

FOREIGN PATENT DOCUMENTS

| JP | 10207573 | A | * | 8/1998 | ................ G06F 1/16 |
| JP | 10340135 | A | * | 12/1998 | ................ G06F 1/16 |

* cited by examiner

*Primary Examiner* — Daniel J Colilla
(74) *Attorney, Agent, or Firm* — O'Connell Law Firm; Thomas P. O'Connell

(57) ABSTRACT

A computer keyboard system with alternative exercise capabilities for the prevention of repetitive stress injuries in a user. The computer keyboard system has a computer keyboard and first and second non-typing, laterally movable exercise mechanisms retained by the computer keyboard. The exercise mechanisms are intermittently actuable as an alternative physical exercise to typing movements to prevent repetitive stress injuries. Operation of the keyboard can be impaired after a period of operation as measured by a typing parameter, such as keystrokes or typing time, and restored through actuation of the non-typing exercise mechanism.

14 Claims, 3 Drawing Sheets

COMPUTER KEYBOARD SYSTEM WITH ALTERNATIVE EXERCISE CAPABILITIES FOR THE PREVENTION OF REPETITIVE STRESS INJURIES

FIELD OF THE INVENTION

The present invention relates generally to computer keyboards. More particularly, disclosed herein is a computer keyboard with compelled breaks in typing activity and an exercise mechanism for assisting in the prevention of repetitive stress injuries.

BACKGROUND OF THE INVENTION

Computer-related hand and wrist injuries have become increasingly common as more and more people spend at least part of their day operating a computer keyboard. Continual use of keyboards over extended periods of time can lead to repetitive stress injuries, alternatively referred to as cumulative trauma disorders, including tendinitis, carpal tunnel syndrome, cysts, and bursitis. A study by the National Institute for Occupational Safety and Health estimated that more than 20 percent of people whose work is primarily done at a computer keyboard are affected.

Symptoms of repetitive stress injuries can range from numbness, tingling, burning, and throbbing to weakness and even paralysis in the fingers, hands, and arms. In addition to pain and discomfort, afflicted people face possible surgery and extensive loss of work and academic time.

While the motions involved in typing are small, so are the muscles and tendons involved, which renders them all the more prone to injury. The large muscles and tendons of, for example, the chest and thigh can take a great deal more use and abuse than the tiny muscles and tendons of the hand. The slightest swelling of the tendons of the hand or in the sheaths that protect them can lead to debilitating pain and make it virtually impossible for a person to type or to do numerous other activities.

With reference to the partially sectioned view of a human hand 50 in FIG. 4, one sees that the hand 50 has tendons 38 that run through the carpal tunnel 32. When a repetitive stress injury becomes symptomatic, the tendons 38 often become swollen. The swollen tendons 38 put pressure on the median nerve 34, and that pressure can result in numbness in the thumb, index and middle finger. Where surgical intervention is required, the most common procedure is to cut the carpal ligament 36 thereby reducing excess pressure of the tendons 38 on the median nerve 34. However, such surgeries require prolonged recovery and can lead to undesired side effects.

A number of inventors have sought to provide solutions to repetitive stress injuries. New keyboards have been proposed with significantly different configurations thereby requiring that the user learn an essentially new typing system. Other keyboard designs provide cushioning seeking to minimize pain and discomfort and, at least to some extent, to minimize the risk of injury. Unfortunately, these and similar proposals still leave the user performing repetitive, potentially damaging typing movements without intermission, perhaps for hours on end.

It has become clear that breaking the cycle of repetitious movement, providing alternative movements and exercises, and stretching can individually and in combination alleviate symptoms of repetitive stress injuries and potentially avoid the need for surgical intervention. However, it may be difficult for a user to determine at what point he or she should pause typing to interrupt the repetitive typing cycle. Furthermore, even knowing the ideal time to take a break, such as by being reminded by a timer or the like, may not be sufficient to force a dedicated user to stop typing. Furthermore, the typist may not be aware of proper exercise and stretching methodologies that might assist in breaking the typing monotony and providing alternative movements, stretching, and exercise.

With that, persons not presently suffering from significant symptoms of a repetitive stress injury will typically ignore the recognized need for taking breaks during typing to stretch, exercise, and simply to break the cycle of repetitive movement. Indeed, even persons already experiencing symptoms of repetitive stress injuries may fail or refuse to take proper breaks and to undertake sufficient exercise and stretching activities.

With an appreciation for the real needs and difficulties of typewriter users under the state of the prior art, it has become apparent to the present inventor that there is a need for a computer keyboard assembly and method for using a keyboard that assist in the prevention and, ideally, the alleviation of repetitive stress injuries by effectively compelling a periodic cessation of typing activities while additionally requiring predetermined periods of exercise and alternative hand movement before returning to typing.

A further challenge that commonly confronts typists is the successful retention and support of documents in a readily viewable manner during typing. Of course, numerous document holders have been disclosed by the prior art. In many arrangements, a document is held or clipped to a board, and the board is supported by a dedicated stand. Other arrangements project from the computer monitor to provide a dangling clip. However, these and further arrangements are bulky and cumbersome and often find their way into storage or are discarded due to relatively infrequent use. There are other document holders that are pivotally coupled to the keyboard so that they form a cover over the keyboard during periods of non-use and must be pivoted to an upright configuration when the keyboard is to be used. With that, the document holder presents an upstanding, obstructive barrier even when the user has no need for it.

It is thus additionally clear that there is a recognized need for a document holder that is neither bulky nor obstructive and that is available when desired but that can be entirely moved to a convenient configuration during periods of non-use without a need for being removed and stored.

SUMMARY OF THE INVENTION

With an appreciation for the state of the art summarized above, the present inventor set forth with the basic object of providing a computer keyboard for assisting in preventing and minimizing the deleterious effects of repetitive stress injuries. A more particular object of embodiments of the invention is to provide a computer keyboard that automatically alerts users to the need for intermittent cessations of typing activity. In certain embodiments, an object of the invention is to provide a computer keyboard that requires a user to cease typing activity intermittently for a predetermined time period before a resumption of typing is permitted. Still another object of embodiments of the invention is to provide a computer keyboard that incorporates non-typing exercise mechanisms for operation by a user. It is further contemplated to provide a computer keyboard that requires operation of the non-typing exercise mechanisms for a predetermined time period or for a predetermined number of cycles to render the keyboard operational for typing after a break in typing.

Still another object of embodiments of the invention is to provide a computer keyboard that retains a document holder that is available when desired but substantially unobtrusive during periods of non-use. An additional object of the invention is to provide a computer keyboard that is capable of retaining an electronic device and displaying graphics from the electronic device on a computer monitor in electronic association with the keyboard.

These and in all likelihood further objects and advantages of the present invention will become obvious not only to one who reviews the present specification and drawings but also to those who have an opportunity to make use of an embodiment of the computer keyboard disclosed herein. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention except as it might be expressly limited by the claims.

In carrying forth the aforementioned and further objects, one embodiment of the invention for a computer keyboard system with alternative exercise capabilities for the prevention of repetitive stress injuries in a user is founded on a computer keyboard with a plurality of keys and a non-typing exercise mechanism retained by the computer keyboard. The non-typing exercise mechanism can be intermittently actuated by the user as an alternative physical exercise to typing movements. By doing so, the user can seek to prevent repetitive stress injuries.

The non-typing exercise mechanism can be selectively movable, such as by being laterally movable relative to the keyboard. For providing added exercise benefits, the non-typing exercise mechanism can include means for providing resistance to its movement, such as a compression spring. To permit exercise by both hands of the user, there can be first and second laterally movable non-typing exercise mechanisms, which can take the form of L-shaped laterally moveable members with upstanding handles for being gripped by a user during actuation of the non-typing exercise mechanisms.

Means can be provided for reminding the user to take a break from typing after a period of operation. That means could comprise a means for impairing operation of the keyboard after the period of operation, and the system can further include a means for restoring operation of the keyboard through actuation of the non-typing exercise mechanism. The means for reminding the user to take a break from typing after a period of operation can include a means for measuring a typing parameter chosen from the group consisting of typing time and typing keystrokes. The period of operation could be fixed for all users, or it could be adjustable for individual users, such as based on guidance of medical personnel. Still further, means, such as lights, sounds, or a combination thereof, can be provided for reminding the user to take a break from typing prior to an expiration of the period of operation.

Additional convenience can be realized by incorporation of a document holder. The document holder can have a plurality of apertures therein corresponding to the pattern of at least some of the keys on the keyboard. With this, the document holder can receive keys of the keyboard therethrough. In certain embodiments, the document holder can be pivotally coupled to the keyboard.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The computer keyboard disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

Figure 1:
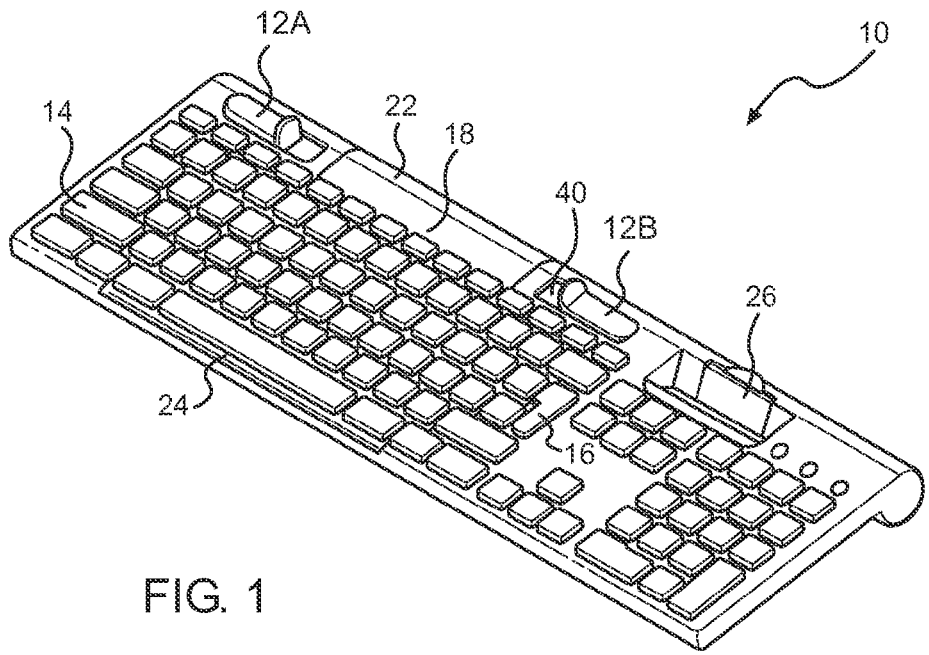
FIG. 1 is a perspective view of a computer keyboard according to the present invention.

An embodiment of a computer keyboard pursuant to the present invention is indicated generally at 10 in FIG. 1. As shown, the keyboard 10 can include the typical numerical, character, and function keys, including a shift key 14, letter keys 15, and a return key 16. The keyboard 10 has a left side, a right side, a distal edge designed to face away from a user, and a proximal edge designed to face toward a user. While the keyboard 10 is illustrated as being an independent structure, such as would be used with a desktop computer or the like, it will be appreciated that the keyboard 10 could readily be incorporated into a laptop computer, a netbook, and even smaller portable electronic devices with keyboard functionality.

Figure 3:
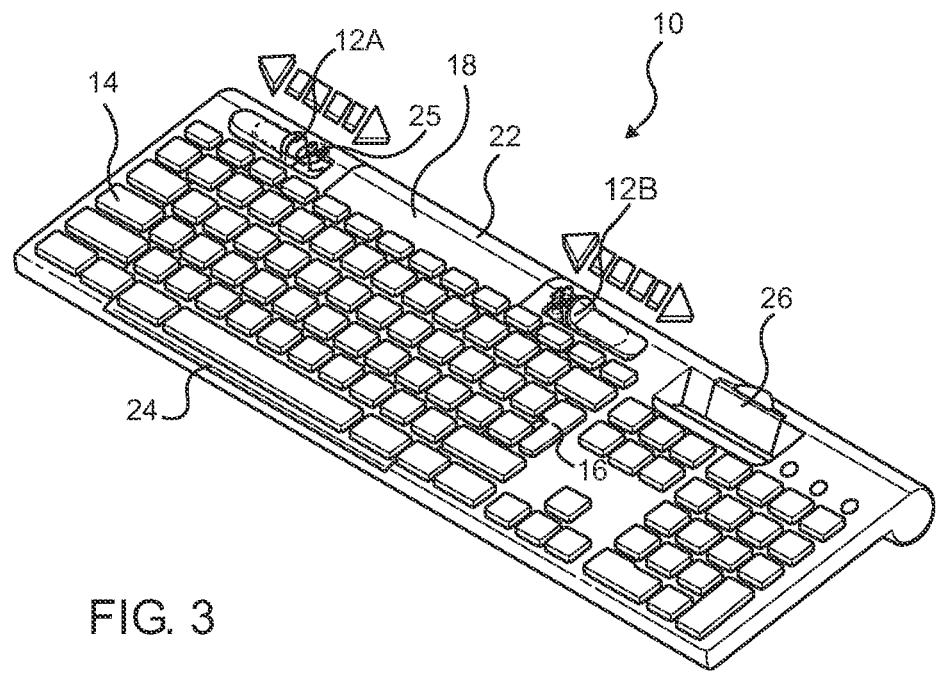
FIG. 3 is a perspective view of the computer keyboard of FIG. 1 depicting movement of the hand/finger exercise mechanism.
Figure 4:
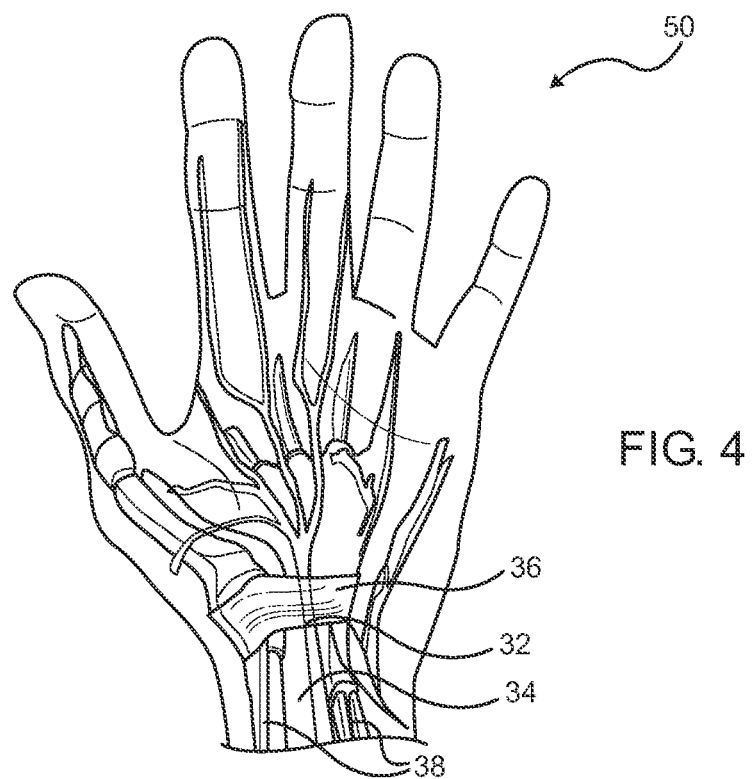
FIG. 4 is a partially sectioned view of a human hand displaying the areas affected by repetitive stress injury.

As can be appreciated by combined reference to FIGS. 1 and 3, left and right movable exercise handles 12A and 12B are retained adjacent to the distal edge of the keyboard 10 for lateral, sliding reciprocation. The handles 12A and 12B, which can be made of plastic or any other suitable material, have an L-shaped body portion with a first leg of the L being retained in a slide channel 40 in the body of the keyboard 10 and with a second leg of the L projecting upward, generally perpendicularly to the surface of the keyboard 10.

While the handles 12A and 12B could be freely movable, it is contemplated that means can be provided for providing resistance to movement of the handles 12A and 12B. For example, the handles 12A and 12B can be biased to central positions with the possibility of lateral movement in left and right lateral directions or to a given terminal position with the possibility of lateral movement in a given lateral direction. As shown in the embodiment of FIG. 3, for example, the handles 12A and 12B are biased to the outboard ends of the respective channels 40. With that, the handles 12A and 12B can be repeatedly slid against biasing resistance laterally inwardly toward one another by a user.

Biasing resistance can be provided to the handles 12A and 12B by any effective means. By way of example and not limitation, resistance could be provided by tension and, additionally or alternatively, compression springs 25 retained within the keyboard 10. For example, compression springs 25 can have first ends coupled to the keyboard 10 and second ends coupled to the handles 12A and 12B. Alternatively, resiliently compressible foam members (not shown) could be disposed to be compressed by lateral movement of the handles 12A and 12B. In a still further alternative, means can be provided simply for resisting movement of the handles 12A and 12B from any position. For example, movement of the handles 12A and 12B can be resisted by high friction material, such as material underlying or disposed to either or both edges of the handles 12A and 12B. These and further means and combinations of means could be provided for resisting movement of the handles 12A and 12B within the scope of the invention.

Under this construction, the handles 12A and 12B and the keyboard 10 in general can be employed to prevent or alleviate repetitive stress injuries by a user's taking intermittent breaks from typing to reciprocate the handles 12A and 12B repeatedly. The exercise provided by repeatedly moving the handles 12A and 12B laterally achieves a number of benefits considered crucial to avoiding and combating repetitive stress injuries. Most basically, the movement of the handles 12A and 12B provides an important interruption to the repetitive movements involved in typing. Moreover, the lateral movement of the handles 12A and 12B against biasing resistance provides exercise with hand motion that is fundamentally different from the repeated pressing or pecking involved in typing. As such, movement of the handles 12A and 12B requires the use of different muscles and tendons and involves different nerve groups. The damaging repetitive muscle and nerve motion that causes repetitive stress injuries is thus beneficially interrupted. It should be appreciated that, although the handles 12A and 12B are believed to be advantageous in combating repetitive stress injuries, other or additional non-typing exercise mechanisms could be incorporated into the keyboard 10 within the scope of the invention. Such exercise mechanisms could involve similar or different types of movement or muscular exertion.

Embodiments of the invention are possible where periodic breaks from typing with interposed periods of exercise provided by movement of the handles 12A and 12B are optional. The user could thus interrupt typing and perform exercises at his or her discretion employing whatever reminder system he or she might devise.

However, in certain potentially preferred embodiments, the keyboard 10 can incorporate means for reminding a user to take periodic breaks to perform hand exercises after a given period of operation. Still further, embodiments of the invention can provide means for temporarily impairing the functionality of the keyboard 10, possibly by terminating the typing functionality of the keyboard 10, after a predetermined time period, after a predetermined number of cycles of keystroke operation, or after some combination or multiplication thereof. Suggested or required breaks can be measured based on total time typing, based on a total number of keystrokes, based on a number of keystrokes in a given time period, based on a total number of strokes of a given key or keys, or by any combination thereof or by any other method.

The need for a break in typing can be predetermined and fixed for all users of the keyboard 10. Alternatively or additionally, the period of operation could be varied based on individual user preferences, or the period of operation could be established for particular users, such as by order or instruction of a medical professional.

Figure 5:
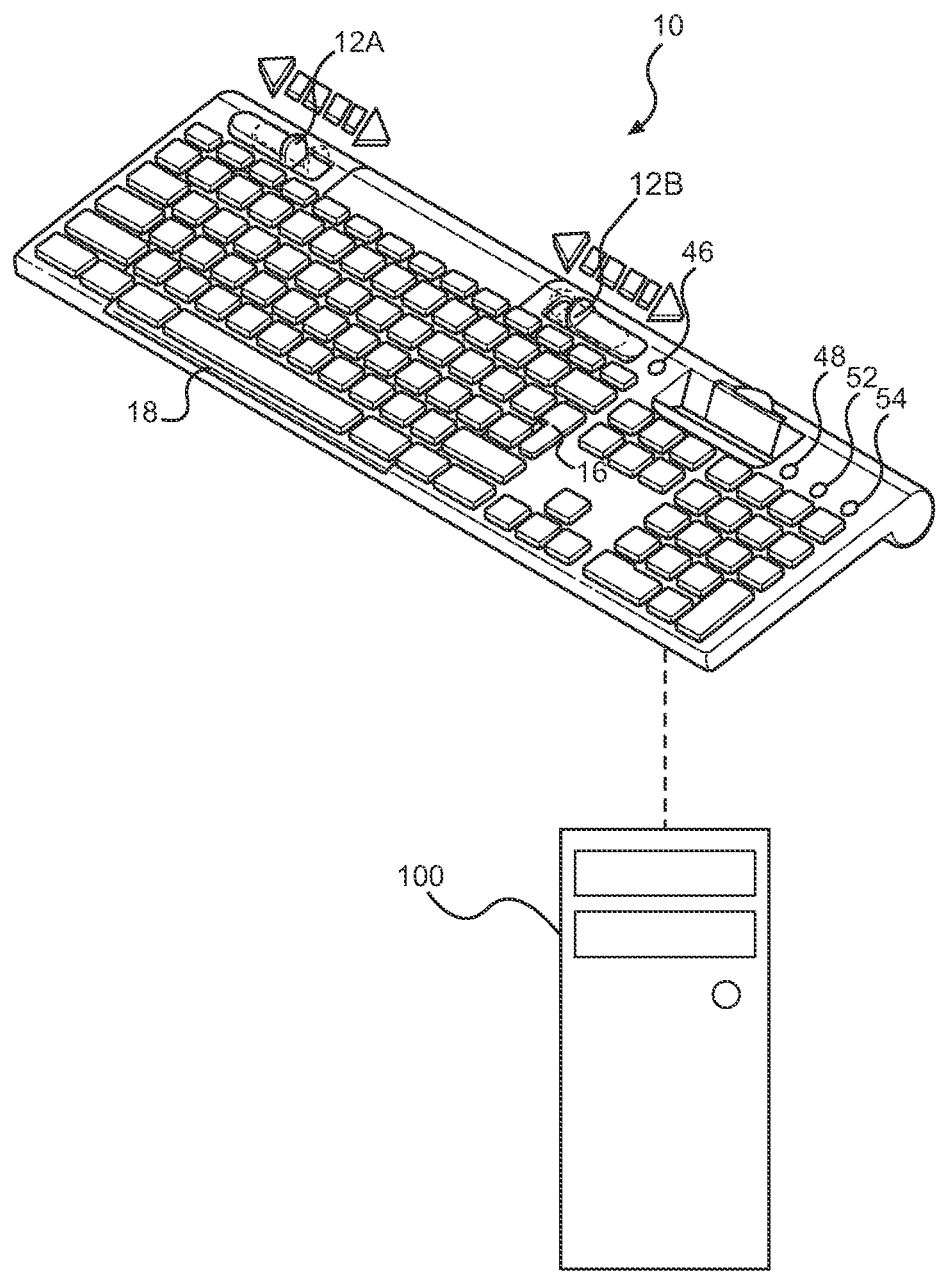
FIG. 5 is a perspective view of an alternative computer keyboard according to the present invention.

Whether based on keystrokes, time duration, or any other method or combination thereof, the timing of the breaks between desired or permitted periods of operation can be measured by memory, logic, and circuitry in the keyboard 10 alone, by a computer 100 operating with dedicated software as in FIG. 5, by any combination thereof, or by any other means. Reminders to take breaks after periods of operation and warnings leading up thereto, can be provided by any effective method, including audible annunciations, visual indications, and any combination thereof, which could be provided by the keyboard 10, by the associated computer 100, or by some other means or combination thereof.

In one example of the invention, system tracks the number of keystrokes being performed. When the user reaches a specified number of keystrokes, whether of an individual key or all keys in combination, alert buttons, which can be incorporated into the shift key 14, one of the letter keys 15, the return key 16, or elsewhere, can be induced to flash thereby warning the user of the upcoming need to take a break in typing. Of course, employing the shift, letter, and return keys 14, 15, and 16 as flashing indicators is merely exemplary and not limiting. The flashing function could be incorporated into any other key or keys, into a surface of the keyboard, on a computer screen, or elsewhere. For example, the flashing function could preferably be incorporated directly into the handles 12A and 12B themselves so that they can provide their own indication of the typist's need to take a break from typing to actuate the handles 12A and 12B.

When the keys 14, 15, 16 or the handles 12A and 12B flash, the typing function of the keyboard 10 can be permitted to continue for a given additional period of time, for a given number of additional keystrokes, or not at all. The flashing of the keys 14, 15, 16 or the handles 12A and 12B can become increasingly frequent as the time or keystroke limit is approached, and the keys 14, 15, 16 or the handles 12A and 12B can continuously light when a critical number of keystrokes remain, when a critical time period remains, or when no time or keystrokes remain. Once the maximum typing time or number of keystrokes has been reached without the user's taking an exercise break, the typing functionality of the keyboard 10 can be diminished or terminated. The keys 14, 15, 16 or the handles 12A and 12B could remain continuously illuminated, or they could go dark to indicate the loss of functionality.

To prevent or stop the keys 14, 15, 16 or the handles 12A and 12B from flashing or to restore typing functionality to the keyboard 10 when the maximum continuous usage or other period of operation has been reached, the user must break the routine of typing and reciprocate the handles 12A and 12B repeatedly for a given time period, for a given number of movements, or to meet some other activation requirement. The lateral movement of the handles 12A and 12B advantageously provides a much needed interruption to the repetitive typing motion thereby relieving the stress on, among other things, the flexor tendons 38 in the wrist. The lateral movement of the handles 12A and 12B is in fundamental opposition to the vertical depression of the standard keys 14, 15, and 16. The spring loading and the lateral reciprocation of the handles 12A and 12B requires a horizontal motion of the wrist and fingers, which activates a different group of muscles and nerves than are employed in the motion of striking letters and numerical keys 14, 15, and 16. Actuation of the handles 12A and 12B provides gentle exercise to an entire group of wrist and hand muscles thereby enhancing the typist's health while interrupting the short, repetitive up-and-down motion involved in standard typing.

Once the user has moved the handles 12A and 12B back and forth a set number of times, for a sufficient time period, or over some other actuation requirement, the keyboard 10 will become operational for typing and the alert keys 14, 15, 16 or the handles 12A and 12B will stop flashing. The keyboard 10 can be rendered operational for the same predetermined period of operation or for some varied period of operation. For example, periods of operation can be reduced or increased over a given day, week, or otherwise.

The number of exercise movements, the time period for actuating the handles 12A and 12B, or any other actuation requirement for restoring operation of the keyboard 10 can be predetermined and integrated into the keyboard 10 at manufacture, set by the individual user, or predetermined for a given user by, for example, a medical professional. The programming of the keyboard 10 can additionally vary even for an individual user, such as by adjusting actuation requirements and typing intervals based on the time of day, the total keystrokes for a given day, week, or other time period, injury or typing history, or on some other basis.

It is also possible during use of the keyboard 10 for a person periodically to actuate the handles 12A and 12B prospectively thereby to prevent activation of the flashing keys 14 and 16, the emission of any sound indications, or any other warnings. In any case, sufficient actuation of the handles 12A and 12B will reset the permissible time period, keystroke count, or other period of operation before a further break is required. With this, periodic breaks coupled with therapeutic alternative exercise movements are not merely encouraged; they are literally compelled by the keyboard 10.

It could be possible within the scope of the invention to provide a means for switching off the timing or key count features of the invention. With this, normal usage of the keyboard 10 can be permitted, such as where a person is not suffering from any risk of repetitive stress injury, based an urgent situation, or for some other reason.

Under certain constructions of the keyboard 10 as indicated in FIG. 5, a computer chip with dedicated programming or dedicated programming in the computer 100 can actively monitor typing and provide real-time, immediate information and, additionally or alternatively, subsequent details regarding the user's actual typing, potentially in comparison to optimum typing rates, which can be measured in keystrokes per minute or otherwise. Where the typist is within a preferred typing rate range, a blue indicator light 48 can be illuminated. Where the typist is outside the preferred typing rate range but not in a range determined to be excessively harmful, an amber indicator light 52 can be illuminated, and where the typist is in a range determined to be excessively harmful or where the typist has operated outside of the preferred range for all typists or that typist in particular for more than a predetermined period of time, a red indicator light 54 can be illuminated. The amber indicator light 52 can thus provide the typist with an indication of the buildup of stress in his or her hands and wrists with the concomitant risk of repetitive stress injury. The red indicator light 54 indicates that there is a high risk of injury, and the keyboard 10 can be programmed to terminate typing functionality for a given time period or until the handles 12A and 12B are actuated sufficiently if the typist continues outside of the preferred typing speed range. Again, the keyboard 10 can have a function permitting override or disabling of the warning and, additionally or alternatively, the shutdown functions.

The indicator lights 48, 52, and 54 and the operation of the keyboard 10 in general can be entirely predetermined or based in whole or in part on the typist's own capabilities or history. For example, an individual capable of typing forty words per minute may trigger the red indicator light 54 when he or she attempts to type at sixty words per minute, but a person capable of typing eighty words per minute may have a blue indicator light 48 at the same typing speed.

Since a responsible employer has a vested, fiduciary interest in the health of its employees, embodiments of the keyboard 10 can additionally relay information regarding typing patterns to a central authority, such as a human resource department or any other designated entity or entities. The keyboard 10 can automatically provide real-time typing data or necessary warnings to the designated entity that a given employee is exposing him or herself to excessive typing and increased risks for injury. The keyboard 10 could communicate in any effective manner, including by wired connection, by wireless network, or by a Bluetooth transmission, such as through a Bluetooth relay 46. Alternatively or additionally, the keyboard 10 system could, either alone or in combination with a computer 100 or a central database, record data in electronic memory to enable subsequent review of typing practices to evaluate employee risks. In either case, a system and method can be provided for preemptively addressing and remedying potentially damaging practices, including through early medical examinations, proper treatment, and behavioral modification. Corporations can thus increase the health of their workers while reducing loss through increased productivity and reduced loss of workers to injury.

To render typing still more convenient, the keyboard 10 further incorporates a document holder 18 that is pivotally coupled to the distal edge of the keyboard 10 by a hinge 22. The document holder 18 essentially comprises a panel formed into a latticework structure with a plurality of apertures 42 therein corresponding to the shape, size and location of the keys of the keyboard 10 over which the document holder 18 is disposed when the document holder 18 is pivoted to a storage position as shown in FIGS. 1 and 3. With this, the corresponding keys of the keyboard 10 can be received through the apertures 42 in the document holder 18 to permit the document holder 18 to lie flat against the keyboard 10 nested between the keys 14, 15, and 16. The document holder 18 thus achieves an entirely unobtrusive position and, indeed, can be argued to provide further protection to the interstices between and below the keys.

As shown in FIG. 3, the document holder 18 has a tab portion 24 that projects beyond the proximal edge of the keyboard 10 thereby to permit the document holder to be raised and lowered readily. When a document 20 is to be supported, the tab portion 24 of the document holder 18 can be engaged and lifted thereby to pivot the document holder 18 to the inclined angle shown in FIG. 2. The base of the document 20 can be supported by a base tab 44 portion of the document holder 18 to prevent inadvertent dislodging of the document 20. When the document holder 18 is no longer required, it can be pivoted to a storage orientation, and the tab 24 can be used as necessary to push the holder 18 down into a nesting arrangement with the keyboard 10.

Figure 2:
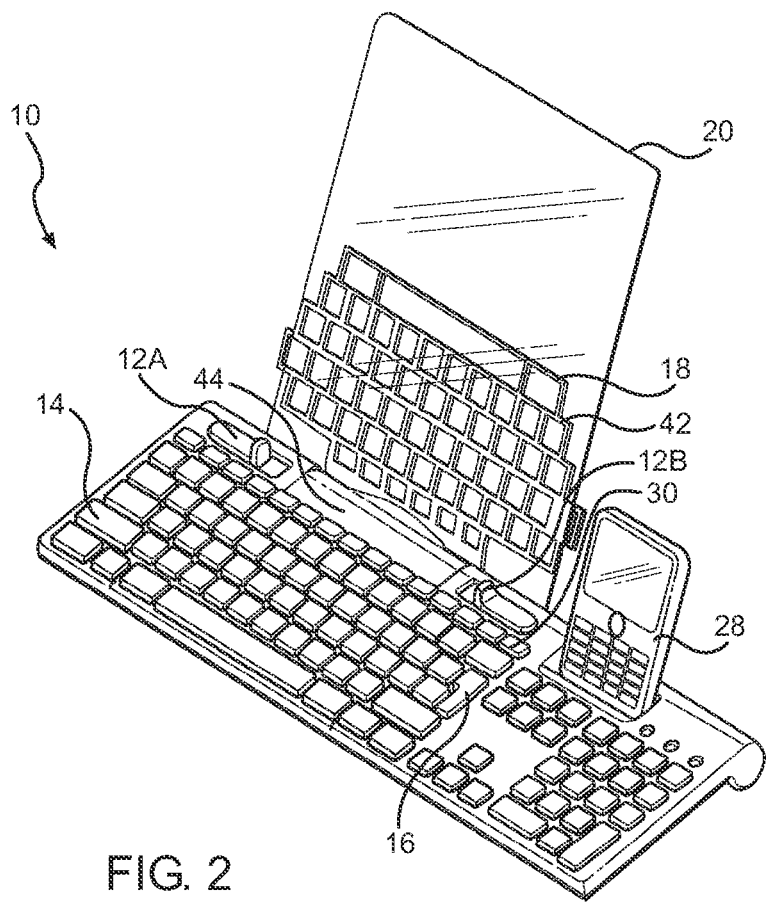
FIG. 2 is a perspective view of the computer keyboard of FIG. 1 shown with a document holder in a use position.

Still further, the keyboard 10 can include a docking station 26. The docking station 26 provides a receiving channel for matingly receiving a base of an electronic device, such as an internet-enabled mobile telephone 28 as shown in FIG. 2. The docking station 26 can provide electrical connections for electronically engaging and potentially charging the telephone 28. Alternatively, communication with the telephone 28 can be enabled wirelessly, such as by the Bluetooth connection 46. When the phone 28 is engaged with the docking station 26, a user can push a switch-mode button 30 to sync the phone 28 with the computer 100. Upon pushing the button 30, the contents displayed on the screen of the phone 28 can be displayed on the computer monitor (not shown), and manipulation of the telephone functions can be undertaken through the keyboard 10.

Furthermore, the computer 100 and telephone 28 can sync as necessary to back up data and otherwise exchange electronic information. With content from the telephone 28 displayed on the computer monitor and able to be manipulated by the keyboard 10, the user can scroll through, update, and otherwise use the telephone 28 via the computer keyboard 10 and mouse (not shown). The telephone 28 and the keyboard 10 can be disengaged electronically by, for example, pushing the button 30 again to deactivate the telephone display on the computer screen and to terminate communication between the telephone 28 and the keyboard 10.

With certain details and embodiments of the computer keyboard 10 and system of the present invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A computer keyboard system with alternative exercise capabilities for the prevention of repetitive stress injuries in a user, the computer keyboard system comprising:
    a computer keyboard with a plurality of keys;
    a non-typing exercise mechanism retained by the computer keyboard, the non-typing exercise mechanism intermittently actuable as an alternative physical exercise to typing movements for the prevention of repetitive stress injuries in the user;
    a means for reminding the user to take a break from typing after a period of operation comprising a means for impairing operation of the keyboard after the period of operation; and
    a means for restoring operation of the keyboard through actuation of the non-typing exercise mechanism.

2. The computer keyboard system of claim 1 wherein the non-typing exercise mechanism is selectively movable.

3. The computer keyboard system of claim 2 further comprising means for providing resistance to movement of the non-typing exercise mechanism.

4. The computer keyboard system of claim 2 wherein the non-typing exercise mechanism is laterally movable relative to the computer keyboard.

5. The computer keyboard system of claim 4 wherein there are first and second laterally movable non-typing exercise mechanisms wherein the first and second non-typing exercise mechanisms are intermittently actuable as an alternative physical exercise to typing movements for the prevention of repetitive stress injuries in the user.

6. The computer keyboard system of claim 5 wherein the first and second laterally movable non-typing exercise mechanisms comprise upstanding handles for being gripped by a user during actuation of the non-typing exercise mechanisms.

7. The computer keyboard system of claim 1 wherein there are first and second non-typing exercise mechanisms wherein the first and second non-typing exercise mechanisms are intermittently actuable as an alternative physical exercise to typing movements for the prevention of repetitive stress injuries in the user.

8. The computer keyboard system of claim 1 wherein the means for reminding the user to take a break from typing after a period of operation further comprises a means for measuring a typing parameter chosen from the group consisting of typing time and typing keystrokes.

9. The computer keyboard system of claim 1 wherein the period of operation is fixed for all users.

10. The computer keyboard system of claim 1 wherein the period of operation is adjustable for individual users.

11. The computer keyboard system of claim 1 further comprising a means for reminding the user to take a break from typing prior to an expiration of the period of operation.

12. The computer keyboard system of claim 1 further comprising a means for reminding the user to take a break from typing after a period of operation comprising a means for measuring a typing parameter chosen from the group consisting of typing time and typing keystrokes and further comprising a means for relaying measured typing parameters to a central authority.

13. The computer keyboard system of claim 1 wherein the keys on the keyboard are disposed in a pattern and further comprising a document holder with a plurality of apertures therein corresponding to the pattern of at least some of the keys on the keyboard such that the document holder can receive keys of the keyboard therethrough.

14. The computer keyboard system of claim 13 wherein the computer keyboard has a proximal edge and a distal edge and wherein the document holder is pivotally coupled to the distal edge of the keyboard.

* * * * *